United States Patent
Patel et al.

(10) Patent No.: US 11,962,633 B2
(45) Date of Patent: Apr. 16, 2024

(54) AUTOSCALING A DISTRIBUTED STREAMING PLATFORM IN AN EVENT-DRIVEN MICROSERVICE ARCHITECTURE

(71) Applicant: International Business Machines Corporation, Armonk, NY (US)

(72) Inventors: Parav Patel, Markham (CA); Carlos Daniel Cavanna, Toronto (CA); Yang Yao, Markham (CA)

(73) Assignee: International Business Machines Corporation, Armonk, NY (US)

( * ) Notice: Subject to any disclaimer, the term of this patent is extended or adjusted under 35 U.S.C. 154(b) by 576 days.

(21) Appl. No.: 17/149,717

(22) Filed: Jan. 14, 2021

(65) Prior Publication Data

US 2022/0224660 A1    Jul. 14, 2022

(51) Int. Cl.
*H04L 65/613*    (2022.01)
*H04L 51/043*    (2022.01)
(Continued)

(52) U.S. Cl.
CPC .......... *H04L 65/613* (2022.05); *H04L 51/043* (2013.01); *H04L 65/1093* (2013.01);
(Continued)

(58) Field of Classification Search
CPC . H04L 65/613; H04L 51/043; H04L 65/1093; H04L 65/403; H04N 21/23103;
(Continued)

(56) References Cited

U.S. PATENT DOCUMENTS

2015/0046541 A1*  2/2015 Kang .................... H04L 45/28
                                                            709/206
2017/0357703 A1   12/2017 Theimer
(Continued)

OTHER PUBLICATIONS

Goswami, Suhita, "Scalability of Kafka Messaging using Consumer Groups", Cloudera Blog, May 10, 2018, 6 pages, <https://blog.cloudera.com/scalability-of-kafka-messaging-using-consumer-groups/>.

(Continued)

*Primary Examiner* — Jefferey F Harold
*Assistant Examiner* — Franklin S Andramuno
(74) *Attorney, Agent, or Firm* — Edward P. Li (57) ABSTRACT

A computer-implemented method and computer program product for autoscaling a streaming platform in an event-driven microservice architecture. Upon a new consumer being added to a consumer group, the streaming platform triggers a rebalance phase if the number of the consumers in the consumer group is less than the number of the partitions and assign a new partition if the number of the consumers in the consumer group is greater than the number of the partitions. Upon a consumer being removed from a consumer group, in response to determining that the number of partitions is greater than the number of consumers, the streaming platform stops message publishing to a partition that is consumed by the consumer, allows remaining messages in the partition to be consumed, and deletes the partition in response to determining that all the remaining messages are consumed.

10 Claims, 9 Drawing Sheets

(51) Int. Cl.
  *H04L 65/1093* (2022.01)
  *H04N 21/231* (2011.01)
  *H04N 21/239* (2011.01)
  *H04N 21/24* (2011.01)
  *H04N 21/2668* (2011.01)
  *H04L 65/403* (2022.01)

(52) U.S. Cl.
  CPC ..... *H04N 21/23103* (2013.01); *H04N 21/239* (2013.01); *H04N 21/24* (2013.01); *H04N 21/2668* (2013.01); *H04L 65/403* (2013.01)

(58) Field of Classification Search
  CPC ... H04N 21/239; H04N 21/24; H04N 21/2668
  See application file for complete search history.

(56) References Cited

U.S. PATENT DOCUMENTS

| | | | |
|---|---|---|---|
| 2018/0091588 A1 | 3/2018 | Qin | |
| 2019/0104082 A1* | 4/2019 | Efimov | H04L 47/783 |
| 2019/0303021 A1* | 10/2019 | Favre-Felix | G06F 3/0617 |

OTHER PUBLICATIONS

Khandelwal, Nimesh, "Understanding Kafka—A Distributed Streaming Platform", The Startup, Jul. 2, 2019, 8 pages, <https://medium.com/swlh/understanding-kafka-a-distributed-streaming-platform-9a0360b99de8>.

Mell, et al., "The NIST Definition of Cloud Computing", National Institute of Standards and Technology, Special Publication 800-145, Sep. 2011, 7 pages.

Melo, André, "How Kafka Enables Real-Time Stream Processing—Part 2", AvenueCode Snippets, Jul. 24, 19, 6 pages, <https://blog.avenuecode.com/how-kafka-enables-real-time-stream-processing-part-2>.

Noll, Michael, "Elastic Scaling in the Streams API in Kafka", Confluent, Jul. 12, 2016, 6 pages, <https://www.confluent.io/blog/elastic-scaling-in-kafka-streams/>.

* cited by examiner

AUTOSCALING A DISTRIBUTED STREAMING PLATFORM IN AN EVENT-DRIVEN MICROSERVICE ARCHITECTURE

BACKGROUND

The present invention relates generally to a distributed streaming platform in an event-driven microservice architecture, and more particularly to autoscaling a distributed streaming platform in an event-driven microservice architecture.

In the modern architecture of event-driven microservices, many services rely heavily on streaming data using a distributed streaming platform to deliver messages from one service to another. A service may be writing to the stream or consuming data from it; thus the service becomes the backbone of the application. Keeping the service fine tuned helps with performance and avoids unnecessary waste of resources.

Distributed streaming platforms may include multiple services that read and write to the queue bus. The instances of readers or writers, formally known as consumers or producers, vary depending on workloads they are handling from the queue. As a result, both the producers and consumers, as well as the distributed streaming platform itself, must provide an adequate scaling mechanism to ensure that all services are able to optimize their performance based on workloads they are processing.

SUMMARY

In one aspect, a computer-implemented method for upscaling a streaming platform in an event-driven microservice architecture is provided. The computer-implemented method includes determining whether a number of consumers in a consumer group is less or greater than a number of partitions in a topic, upon a new consumer being added to the consumer group. The computer-implemented method further includes, in response to determining that the number of the consumers in the consumer group is less than the number of the partitions, triggering a rebalance phase to reassign the partitions to the consumers in the consumer group. The computer-implemented method further includes, in response to determining that the number of the consumers in the consumer group is greater than the number of the partitions, adding a new partition to the topic and assigning the new partition.

In another aspect, a computer-implemented method for upscaling a streaming platform in an event-driven microservice architecture is provided. The computer-implemented method includes, upon a consumer being removed from a consumer group that has a greatest number of consumers among consumer groups, determining whether a number of partitions in a topic is greater than a number of consumers in the consumer group. The computer-implemented method further includes, in response to determining whether the number of partitions is greater than the number of consumers, stopping message publishing to a partition that is consumed by the consumer. The computer-implemented method further includes allowing remaining messages in the partition to be consumed by one or more remaining consumers in the consumer group and one or more remaining consumers in consumer groups other than the consumer group. The computer-implemented method further includes determining whether all the remaining messages are consumed. The computer-implemented method further includes, in response to determining that all the remaining messages are consumed, deleting the partition from the topic.

In yet another aspect, a computer program product for downscaling a streaming platform in an event-driven microservice architecture is provided. The computer program product comprises a computer readable storage medium having program instructions embodied therewith, and the program instructions are executable by one or more processors. The program instructions are executable to: determine whether a number of partitions in a topic is greater than a number of consumers in a consumer group, upon a consumer being removed from the consumer group that has a greatest number of consumers among consumer groups; stop message publishing to a partition that is consumed by the consumer, in response to determining whether the number of partitions is greater than the number of consumers; allow remaining messages in the partition to be consumed by one or more remaining consumers in the consumer group and one or more remaining consumers in consumer groups other than the consumer group; determine whether all the remaining messages are consumed; and delete the partition from the topic, in response to determining that all the remaining messages are consumed.

DETAILED DESCRIPTION

The present invention overcomes limitations of distributed streaming platforms in general and derives fundamental concepts from Apache Kafka (an open-source stream-processing software platform developed by the Apache Software Foundation). However, the present invention can be easily expanded to any streaming platform.

Although modern streaming platform systems provide a way for scaling, there are limitations of scaling when one wishes to scale within a group of consumers. In a traditional approach, an administrator of a distributed streaming platform manually updates the number of partitions. More so than often, consumers initialize streaming brokers with more partitions than a service ever requires in its lifecycle. With the manual configuration and re-configuration, the consumers will experience downtime even if only one partition needs to be added. Whereas, by requesting for more partitions than one will ever use, the distributed streaming platform will allocate unused resources. The present invention discloses a partition autoscaling mechanism. The mechanism allows scaling the number of consumer instances to maximize performance and minimize downtime.

The limitations arise when the number of consumers within a consumer group increases or decreases. Current streaming platforms do not allow for multiple consumers within the same consumer group to stream from one partition, in order to maintain ordering of messages. Therefore, if a consumer group is not able to keep up with the number of messages stored in the streaming platform, it may eventually lag behind causing a bottleneck, or depending on the queue configuration, to lose information. Currently, if the number of consumers go beyond the number of partitions, the surplus consumers either remain dormant while utilizing resources or are blocked from being initialized.

In embodiments of the present invention, the proposed autoscaling mechanism enables service holders to provide a range for the number of partitions to scale up and down. There are two cases to be considered for scaling, one is scaling the number of partitions up (to accommodate for increased traffic) and another is scaling the number of partitions down (to reduce unused resources). The ultimate goal is to provide a maximum high and minimum low for the number of partitions that users want their product to support. The streaming platform will take care of scaling up and down depending on the workload of messages and individual consumers. Overall, the present invention automates the scaling of partitions to reflect consumer resource usage, reduces the downtime of consumer services, and optimizes performance of the streaming platform while considering its impact on each consumer group.

In embodiments of the present invention, scaling up is applicable when the maximum number of consumers from a given consumer group exceeds the number of partitions available. This indicates that the excess number of consumers have no partitions assigned to them, hence they are in an idle state. The streaming platform has information regarding the number of consumers assigned to each consumer group for a given topic. Whenever the streaming platform detects that a new consumer is added (for example, a new instance of a client application is started) and therefore determines that a consumer group with the maximum number of consumers exceeds the number of partitions for a given topic. Then, the streaming platform scales up the message queue while maintaining the in-order sequence of messages within the current partitions.

In embodiments of the present invention, during a period of downscaling, more considerations are evaluated in order to properly reduce the number of partitions while ensuring that all messages currently enqueued will be consumed. The streaming platform first stops routing traffic to the terminating partition. Then, the streaming platform increases the priority of the messages being read from the terminating partition, and concurrently checks for either the retention period to trigger or the partition being completely empty. This means that if only one partition needs to be removed, the message queue is still able to continue supporting the others while dynamically flushing out messages from the terminating partition. This process is repeated until the desired amount of partitions is completely consumed during the downscaling phase.

Figure 1:
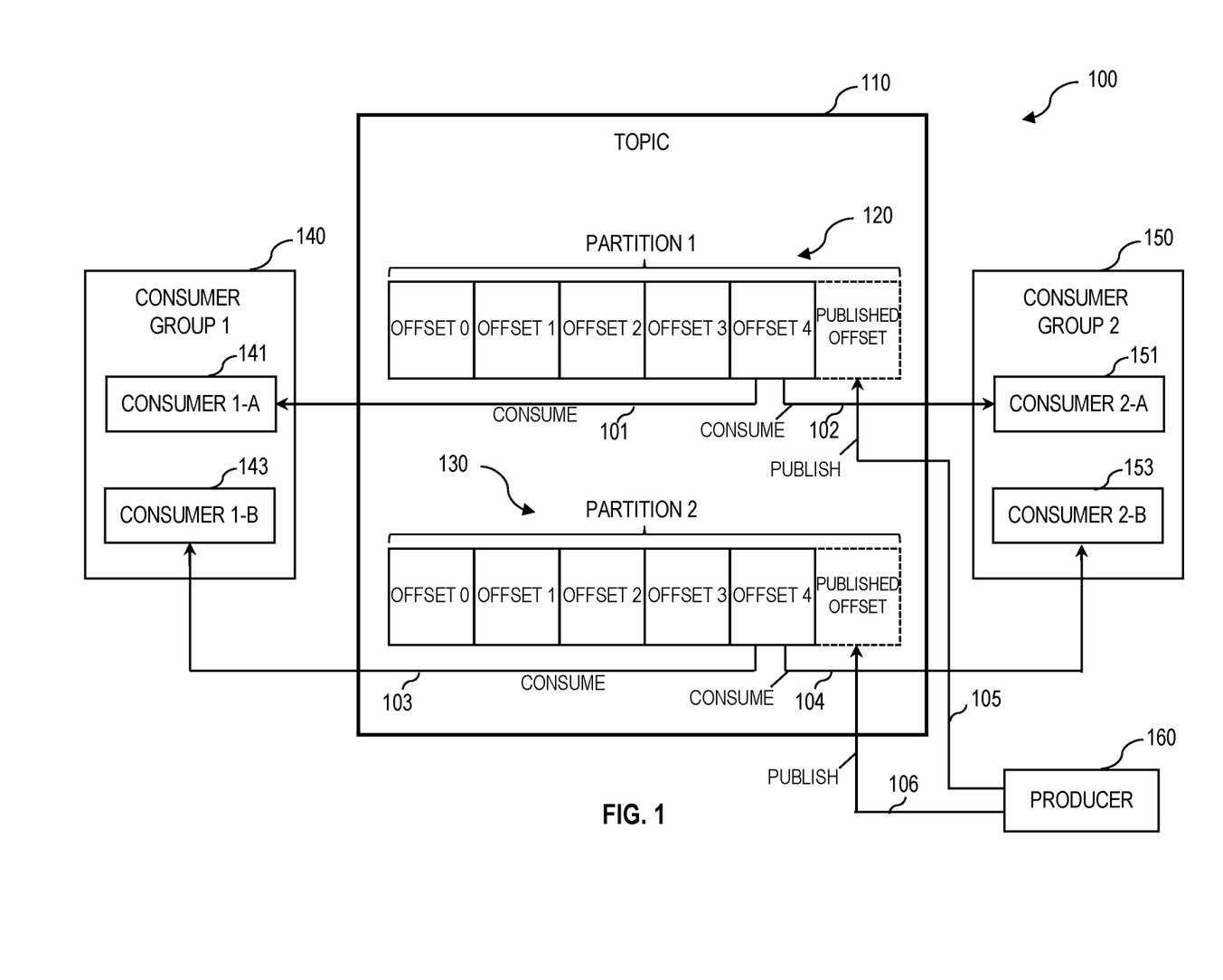
FIG. 1 is a systematic diagram illustrating a distributed streaming platform in an event-driven microservice architecture, in accordance with one embodiment of the present invention.

FIG. 1 is a systematic diagram illustrating distributed streaming platform 100 in an event-driven microservice architecture, in accordance with one embodiment of the present invention. For the purpose of illustrating a simple example of a distributed streaming platform in an event-driven microservice architecture, FIG. 1 is presented in this document. It should be appreciated that FIG. 1 provides only an illustration of one implementation and does not imply any limitations with regard to an environment in which different embodiments may be implemented.

Distributed streaming platform 100 may reside on one or more computing devices or servers. In another embodiment, distributed streaming platform 100 may reside on one or more virtual machines or other virtualization implementations. The one or more virtual machines or the virtualization implementations runs on one or more computing devices or servers. A computing device or server is described in more detail in later paragraphs with reference to FIG. 7.

Distributed streaming platform 100 may be implemented in a network that can be any combination of connections and protocols which support communications among one or more computing devices or servers. For example, the network may be the Internet which represents a worldwide collection of networks and gateways to support communications between devices connected to the Internet; the network may be implemented as an intranet, a local area network (LAN), a wide area network (WAN), and a wireless network. Distributed streaming platform 100 may be implemented in a cloud computing environment. Later paragraphs with reference to FIG. 8 and FIG. 9 describe the cloud computing environment in detail.

FIG. 1 shows distributed streaming platform 100 comprising partition 1 120 and partition 2 130 in topic 110. A partition (such as partition 1 120 or partition 2 130) is a channel used to parallelize the streaming of messages. A topic is a named communication bus between producers and consumers and includes many partitions. Whenever a message is posted in the queue, the message goes to one partition (out of possibly many). FIG. 1 further shows consumer group 1 140 and consumer group 2 150. As illustrated by FIG. 1, consumer group 1 140 includes consumer 1-A 141 and consumer 1-B 143; consumer group 2 150 includes consumer 2-A 151 and consumer 2-B 153. A consumer group is a group of consumers that are treated as a single entity by the queue bus. That is, the queue bus will guarantee that a message in the queue will be delivered to one consumer within the consumer group only. A consumer group comprises multiple consumers that read from one or more partitions. FIG. 1 further shows producer 160; for the purpose of illustration, FIG. 1 shows only one producer. It should be appreciated that a distributed streaming platform may include multiple producers.

FIG. 1 depicts how distributed streaming platform 100 works. Consumer group 1 140 is considered as a group of service instances and consumer group 2 150 is considered as a group of different service instances. Both these services read from streaming platforms (such as partition 1 120 and partition 2 130) in a specific topic (such as topic 110). Distributed streaming platform 100 orchestrates the allocation of partitions to various consumers and rebalances if there are changes in the number of consumers or in the number of partitions. Each consumer (i.e., instance) of the services is allocated a partition where the messages will be delivered from. As shown in FIG. 1, for consumer group 1 140, consumer 1-A 141 consumes messages delivered from partition 1 120 (indicated by arrow 101), and consumer 1-B 143 consumes messages delivered from partition 2 130 (indicated by arrow 103). As shown in FIG. 1, for consumer group 2 150, consumer 2-A 151 consumes messages delivered from partition 1 120 (indicated by arrow 102), and consumer 2-B 153 consumes messages delivered from partition 2 130 (indicated by arrow 104). Producer 160 publishes messages to partition 1 120 and partition 2 130. Distributed streaming platform 100 ensures that a message is published to only one of the partitions and there is no duplicity; as indicated by arrow 105 in FIG. 1, producer 160 publishes a message to partition 1 120; as indicated by arrow 106, producer 160 publishes another message to a different partition—partition 2 130.

One of the current limitations in streaming platforms is that the predefined number of partitions within a topic is a bottleneck for a service to scale its consumers. If a consumer group includes more consumers than the number of partitions, one or more of those consumers will become idle. This may result in taking up resources, slowing down the network in attempts to reconnect to the message broker, and introducing more load during the rebalance phase. In addition, most streaming platforms allocate a pre-defined set of partitions. Therefore, if the number of partitions need to be changed it cannot be done dynamically. The downtime will be introduced if there is a need to change the number of partitions. So, a general practice is to always assign a really high number of partitions to avoid having to do this at a later time.

The above limitation in dynamic scaling of partitions is specific to Apache Kafka's concept of distributing messages amongst partitions. Other streaming platforms such as RabbitMQ have a similar limitation in dynamically scaling the number of message queues or brokers when there is a shift in the load or a shift in the number of consumers reading from those message queues.

Figure 2:
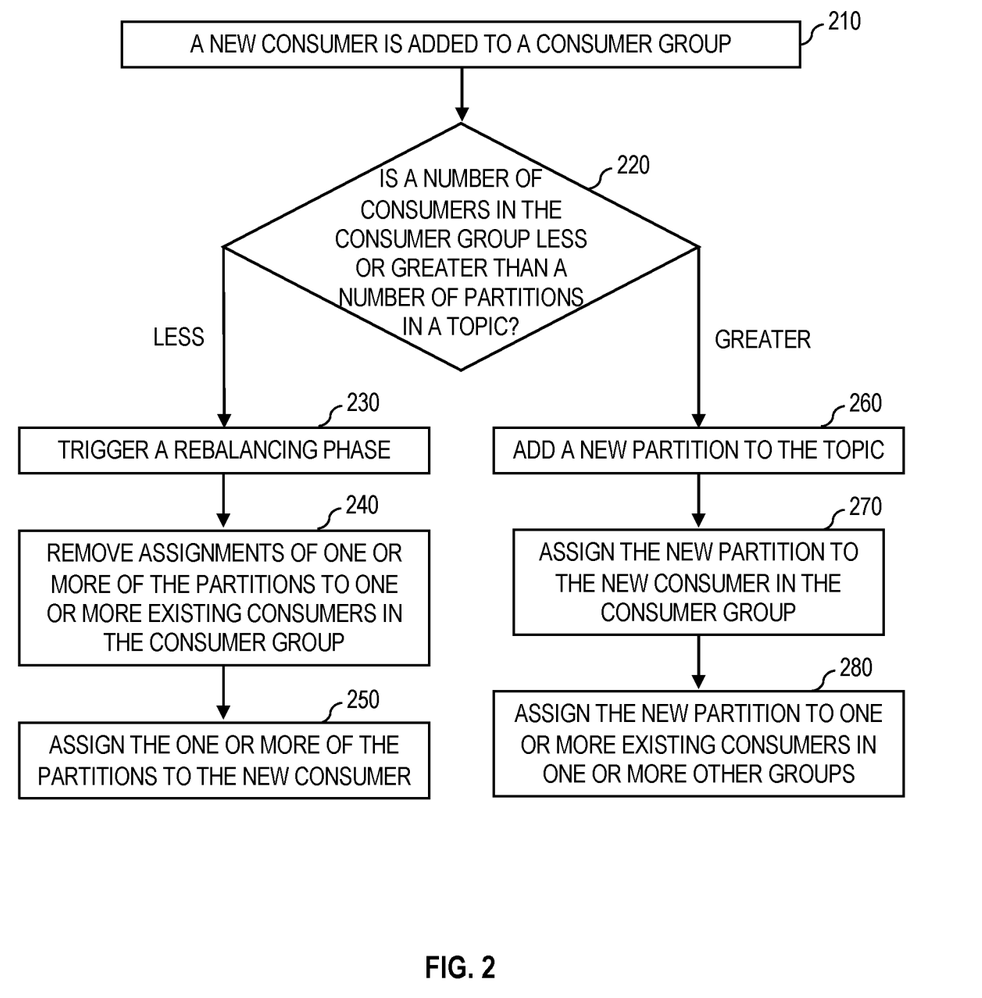
FIG. 2 presents a flowchart showing operational steps of upscaling a distributed streaming platform in an event-driven microservice architecture, in accordance with one embodiment of the present invention.

FIG. 2 presents a flowchart showing operational steps of upscaling a distributed streaming platform in an event-driven microservice architecture, in accordance with one embodiment of the present invention. The operational steps of upscaling the distributed streaming platform are implemented by the distributed streaming platform which is hosted on one or more computing devices or servers.

At step 210, a new consumer is added to a consumer group in the distributed streaming platform. The distributed streaming platform detects the addition of the new consumer to the consumer group. At step 220, the distributed streaming platform determines whether a number of consumers in the consumer group is less or greater than a number of partitions in a topic.

In response to determining that the number of the consumers is less than the number of the partitions, the distributed streaming platform executes steps 230, 240, and 250 to achieve partition upscaling automatically. Detailed description of steps 230, 240, and 250 is provided in later paragraphs in this document. This is a case of upscaling consumers in a smallest consumer group. In this case, the new consumer is added to a consumer group that has fewer consumers than the total number of the partitions within the topic.

Figure 3:
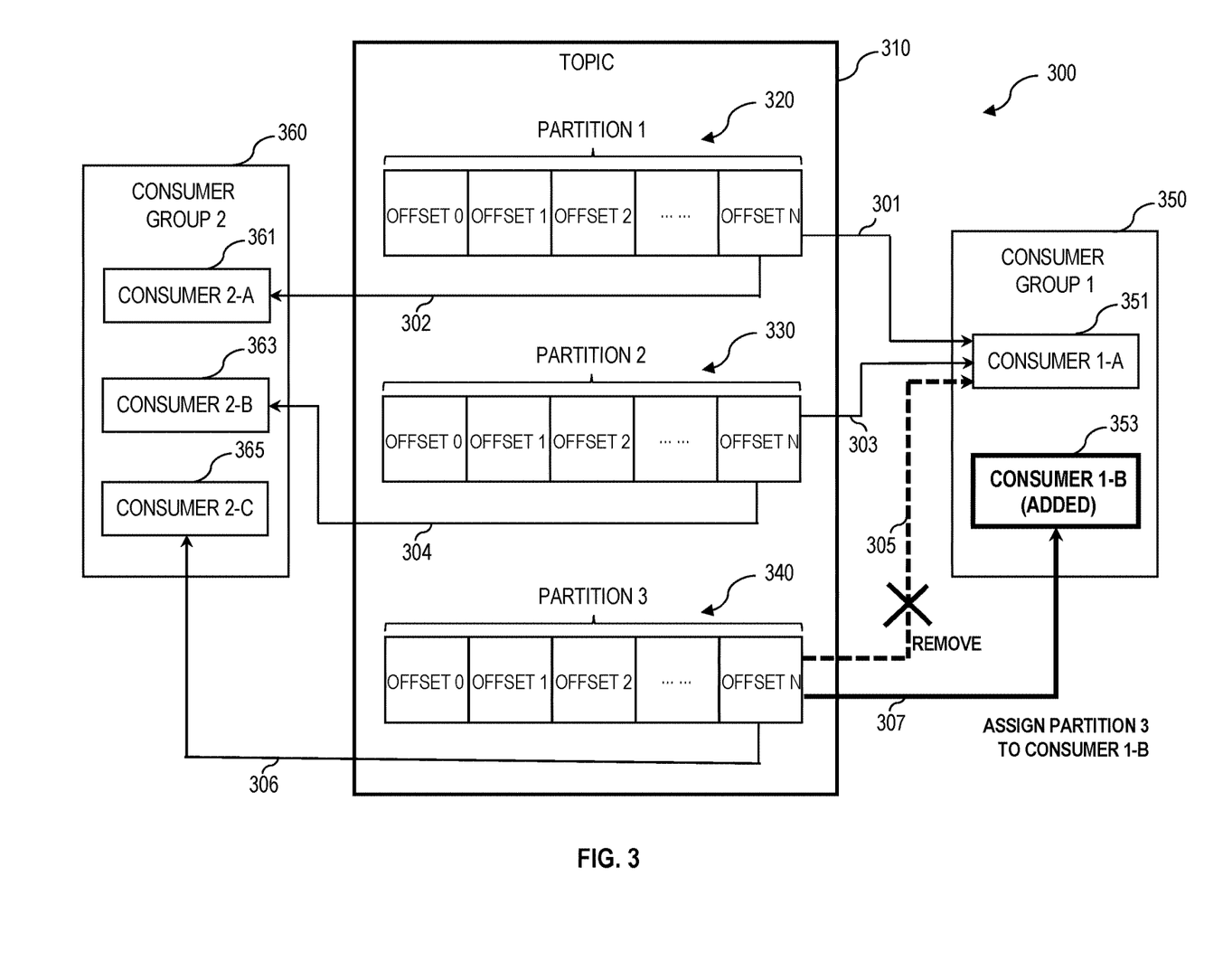
FIG. 3 presents a diagram illustrating upscaling consumers in a consumer group which has fewer consumers than a total number of partitions in a topic for a distributed streaming platform in an event-driven microservice architecture, in accordance with one embodiment of the present invention.

An example of the case of upscaling consumers in the smallest consumer group is described in FIG. 3. In the example shown in FIG. 3, distributed streaming platform 300 includes partition 1 320, partition 2 330, and partition 3 340 in topic 310. Distributed streaming platform 300 further includes consumer group 1 350 and consumer group 2 360. Consumer group 1 350 is the smallest consumer group and initially (prior to adding consumer 1-B 353) includes consumer 1-A 351. Consumer group 2 360 includes consumer 2-A 361, consumer 2-B 363, and consumer 2-C 365. Prior to upscaling consumers, consumer 1-A 351 in consumer group 1 350 consumes messages delivered from partition 1 320 (indicated by arrow 301), messages delivered from partition 2 330 (indicated by arrow 303), and messages delivered from partition 3 340 (indicated by arrow 305). Prior to upscaling consumers, in consumer group 2 360, consumer 2-A 361 consumes messages delivered from partition 1 320 (indicated by arrow 302), consumer 2-B 363 consumes messages delivered from partition 2 330 (indicated by arrow 304), and consumer 2-C 365 consumes messages delivered from partition 3 340 (indicated by arrow 306). As shown in FIG. 3, consumer 1-B 353 is added as a new consumer in consumer group 1 350 (which is the smallest consumer group). Now, distributed streaming platform 300 determines that the number of the consumers in consumer group 1 350 (equal to 2) is less than the number of the partitions in topic 310 (equal to 3). Therefore, for consumer group 1 350, distributed streaming platform 300 executes steps 230, 240, and 250 shown in FIG. 2. Detailed description of steps 230, 240, and 250 is provided in next paragraphs in this document.

Referring back to FIG. 2, at step 230, the distributed streaming platform triggers a rebalancing phase. In the rebalancing phase, the distributed streaming platform will reassign all the partitions to all the consumers within the consumer group. At step 240, the distributed streaming platform removes assignments of one or more of the partitions to one or more existing consumers in the consumer group. The distributed streaming platform attempts to equally distribute all partitions to every consumer in the consumer group. In the example shown in FIG. 3, distributed streaming platform 300 removes the assignment indicated by arrow 305 which has previously been an assignment of partition 3 340 to consumer 1-A 351 in consumer group 1 350.

Referring to FIG. 2, at step 250, the distributed streaming platform assigns the one or more of the partitions to the new consumer. In the example shown in FIG. 3, as indicated by arrow 307, distributed streaming platform 300 assigns partition 3 340 to consumer 1-B 353 which is newly added to consumer group 1 350.

Referring to FIG. 2, in response to determining that the number of the consumers is greater than the number of the partitions, the distributed streaming platform executes steps 260, 270, and 280. This is a case of upscaling consumers in a largest consumer group. In this case, the new consumer is added to the largest consumer group and results in the number of the consumers in the largest group being greater than the number of the partitions.

Figure 4:
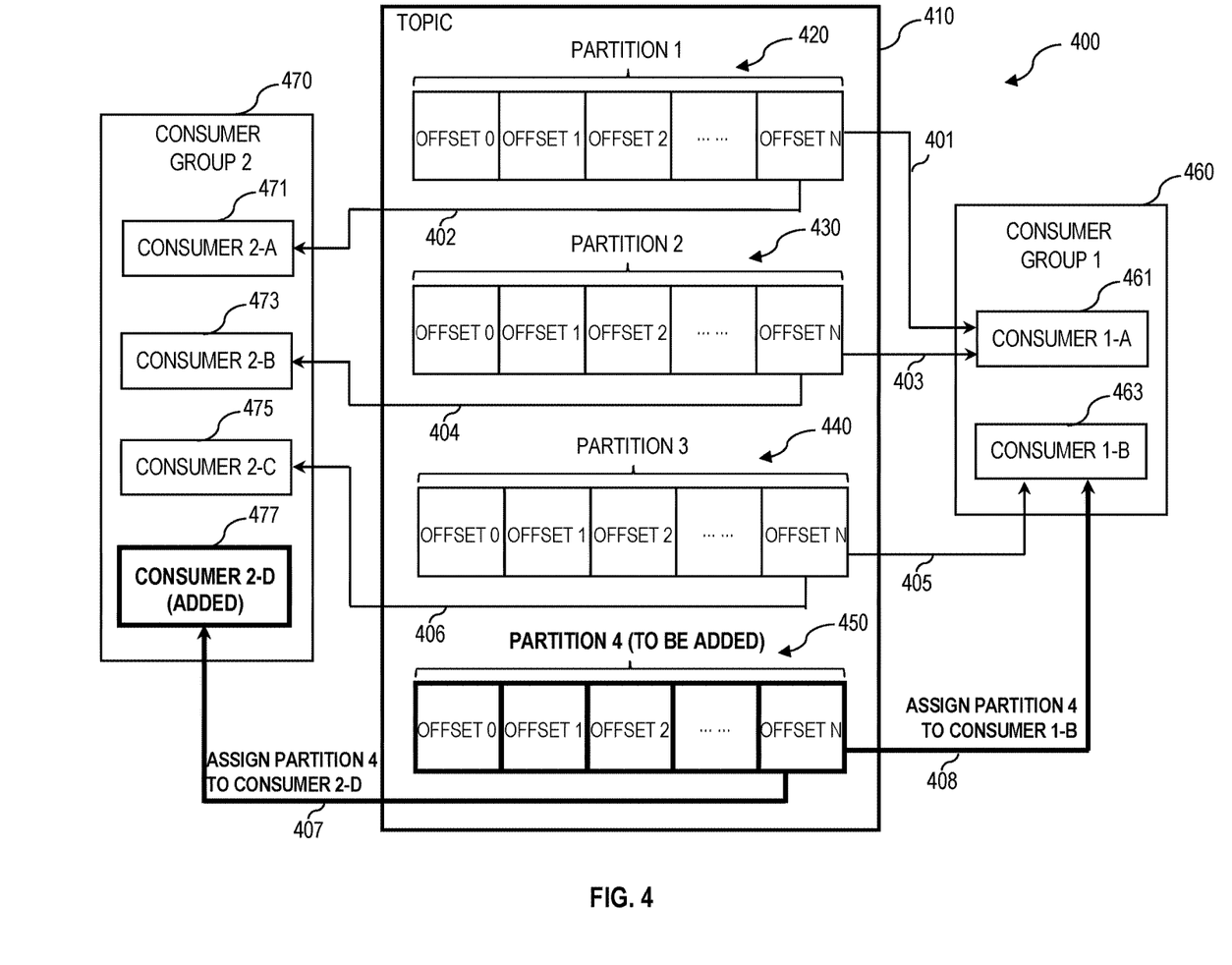
FIG. 4 presents a diagram illustrating upscaling consumers in a consumer group which has more consumers than a total number of partitions in a topic for a distributed streaming platform in an event-driven microservice architecture, in accordance with one embodiment of the present invention.

An example of the case of upscaling consumers in the largest consumer group is described in FIG. 4. In the example shown in FIG. 4, distributed streaming platform 400 initially (prior to upscaling partitions) includes partition 1 420, partition 2 430, and partition 3 440 in topic 410.

Distributed streaming platform 400 further includes consumer group 1 460 and consumer group 2 470. Consumer group 1 460 includes consumer 1-A 461 and consumer 1-B 463. Consumer group 2 470 is the largest consumer group and initially (prior to adding consumer 2-D 477) includes consumer 2-A 471, consumer 2-B 473, and consumer 2-C 475. Prior to upscaling consumers and partitions, consumer 1-A 461 in consumer group 1 460 consumes messages delivered from partition 1 420 (indicated by arrow 401) and messages delivered from partition 2 430 (indicated by arrow 403); consumer 1-B 463 in consumer group 1 460 consumes messages delivered from partition 3 440 (indicated by arrow 405). Prior to upscaling consumers and partitions, in consumer group 2 470, consumer 2-A 471 consumes messages delivered from partition 1 420 (indicated by arrow 402), consumer 2-B 473 consumes messages delivered from partition 2 430 (indicated by arrow 404), and consumer 2-C 475 consumes messages delivered from partition 3 440 (indicated by arrow 406). As shown in FIG. 4, consumer 2-D 477 is added as a new consumer in consumer group 2 470 (which is the largest consumer group). Upon detecting the addition of consumer 2-D 477, distributed streaming platform 400 determines that the number of the consumers in consumer group 2 470 (equal to 4) is now greater than the number of the partitions in topic 310 (equal to 3). Therefore, distributed streaming platform 400 executes steps 260, 270, and 280 shown in FIG. 2, to ensure automatic upscaling of the partitions.

Referring back to FIG. 2, at step 260, the distributed streaming platform adds a new partition to the topic. In the example shown in FIG. 4, distributed streaming platform 400 adds partition 4 450 as a new partition in topic 410. At step 270 shown in FIG. 2, the distributed streaming platform assigns the new partition to the newly added consumer in the consumer group. In the example shown in FIG. 4, distributed streaming platform 400 assigns partition 4 450 (which is the newly added partition) to consumer 2-D 477 (which is the newly added consumer) in consumer group 2 470, as indicated by arrow 407. At step 280, the distributed streaming platform assigns the new partition to one or more existing consumers in one or more other consumer groups. In the example shown in FIG. 4, as indicated by arrow 408, distributed streaming platform 400 assigns partition 4 450 (which is the new partition) to consumer 1-B 463 (which is an existing consumer) in consumer group 1 460 (which is another group other than the consumer group to which the new consumer is added).

Figure 5:
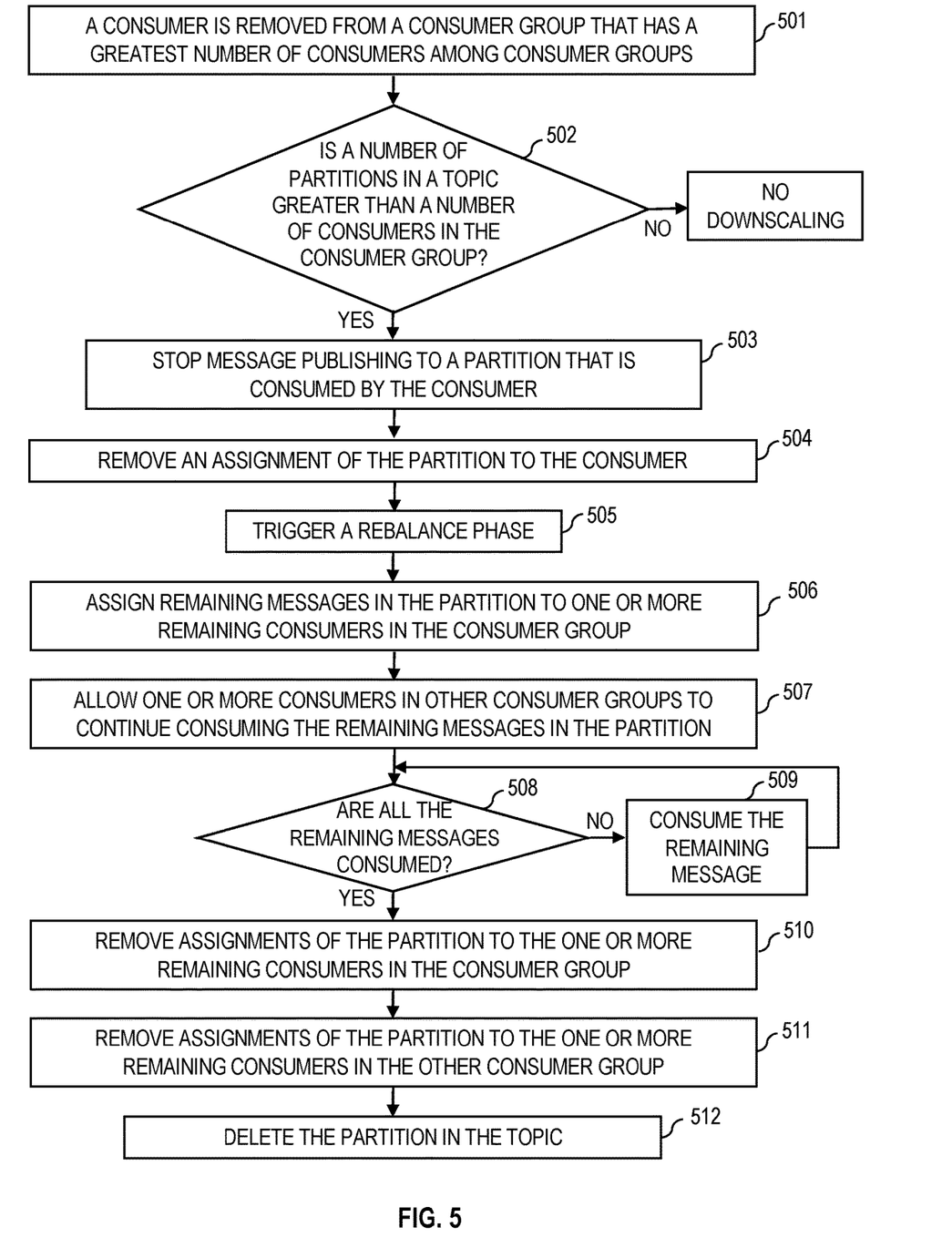
FIG. 5 presents a flowchart showing operational steps of downscaling a distributed streaming platform in an event-driven microservice architecture, in accordance with one embodiment of the present invention.

FIG. 5 presents a flowchart showing operational steps of downscaling a distributed streaming platform in an event-driven microservice architecture, in accordance with one embodiment of the present invention. The operational steps of downscaling the distributed streaming platform are implemented by the distributed streaming platform which is hosted on one or more computing devices or servers.

Referring to FIG. 5, at step 501, a consumer is removed from a consumer group that has a greatest number of consumers among consumer groups. The distributed streaming platform detects the removal of the consumer from the consumer group. Downscaling of partitions can only be triggered if the consumer group with the largest number of consumers is downscaling and the number of consumers in the consumer group is greater than the number of partitions; this will prevent a scenario where a number of consumers within the largest consumer group stays less than the number of partitions and ensures no consumers are draining resources while sitting idle.

Figure 6:
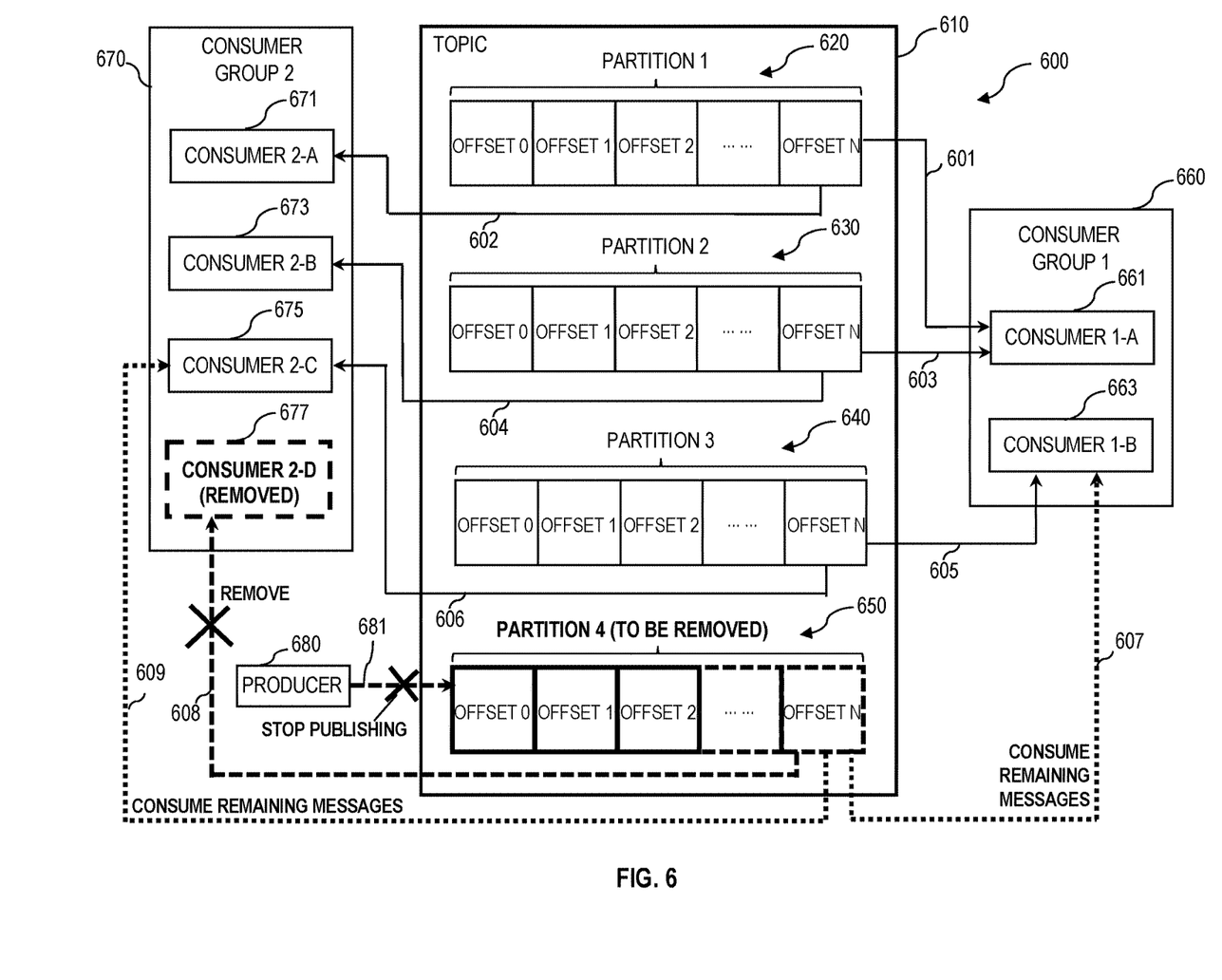
FIG. 6 presents a diagram illustrating downscaling consumers and partitions for a distributed streaming platform in an event-driven microservice architecture, in accordance with one embodiment of the present invention.

An example of the case of downscaling the distributed streaming platform is described in FIG. 6. In the example shown in FIG. 6, distributed streaming platform 600 includes consumer group 1 660 and consumer group 2 670. Consumer group 1 660 includes two consumers: consumer 1-A 661 and consumer 1-B 663, while consumer group 2 670 includes four consumers (prior to downscaling): consumer 2-A 671, consumer 2-B 673, consumer 2-C 675, and consumer 2-D 677. Consumer group 2 670 is a consumer group that has the greatest number of consumers. Distributed streaming platform 600 detects the removal of consumer 2-D 677 from consumer group 2 670.

In the example shown in FIG. 6, prior to removing consumer 2-D 677 and downscaling partitions, messages in partition 1 620 are consumed by consumer 1-A 661 in consumer group 1 660 (which is indicated by arrow 601) and consumed by consumer 2-A 671 in consumer group 2 670 (which is indicated by arrow 602). Prior to removing consumer 2-D 677 and downscaling partitions, messages in partition 2 630 are consumed by consumer 1-A 661 in consumer group 1 660 (which is indicated by arrow 603) and consumed by consumer 2-B 673 in consumer group 2 670 (which is indicated by arrow 604). Prior to removing consumer 2-D 677 and downscaling partitions, messages in partition 3 640 are consumed by consumer 1-B 663 in consumer group 1 660 (which is indicated by arrow 605) and consumed by consumer 2-C 675 in consumer group 2 670 (which is indicated by arrow 606). Prior to removing consumer 2-D 677 and downscaling partitions, messages in partition 4 650 are consumed by consumer 1-B 663 in consumer group 1 660 (which is indicated by arrow 607) and consumed by consumer 2-D 677 in consumer group 2 670 (which is indicated by arrow 608).

Referring to FIG. 5, at step 502, the distributed streaming platform determines whether a number of partitions in a topic is greater than a number of consumers in the consumer group after the consumer is removed at step 501. The distributed streaming platform compares the number of the partitions in the topic and the number of consumers in the consumer group after one consumer is removed. In response to determining that the number of the partitions is not greater than the number of consumers (NO branch of decision block 502), the distributed streaming platform does not perform downscaling. In response to determining that the number of the partitions is greater than the number of consumers (YES branch of decision block 502), the distributed streaming platform will execute steps 503-512 for automatic downscaling.

In the example shown in FIG. 6, distributed streaming platform 600 determines whether the number of partitions in topic 610 is greater than the number of consumers in consumer group 2 670. In the example shown in FIG. 6, topic 610 has four partitions prior to downscaling partitions in topic 610 (namely, partition 1 620, partition 2 630, partition 3 640, and partition 4 650), while consumer group 2 670 has currently three consumers left (namely, consumer 2-A 671, consumer 2-B 673, and consumer 2-C 675) after one consumer (i.e., consumer 2-D 677) is removed.

Referring back to FIG. 5, in response to determining that the number of the partitions is greater than the number of consumers (YES branch of decision block 502), at step 503, the distributed streaming platform stops message publishing to a partition that is consumed by the consumer (which is removed at step 501). In the example shown in FIG. 6, producer 680 in distributed streaming platform 600 stops message publishing (indicated by arrow 681) to partition 4 650.

At step 504, the distributed streaming platform removes an assignment of the partition to the consumer which is removed from the consumer group at step 501. In the example shown in FIG. 6, distributed streaming platform 600 removes the assignment of partition 4 650 to consumer 2-D 677 in consumer group 2 670 (which is indicated by arrow 608). As described in a previous paragraph, the assignment indicated by arrow 608 exists prior to removing consumer 2-D 677 and downscaling partitions.

At step 505, the distributed streaming platform triggers a rebalance phase. At this step, all the partitions will be re-distributed among remaining consumers after the consumer is removed from the consumer group at step 501. In the example shown in FIG. 6, distributed streaming platform 600 re-distributes all the four partitions (namely partition 1 620, partition 2 630, partition 3 640, and partition 4 650) among remaining consumers (including consumer 1-A 661 and consumer 1-B 663 in consumer group 1 660, and including consumer 2-A 671, consumer 2-B 673, and consumer 2-C 675 in consumer group 2 670).

At step 506, the distributed streaming platform assigns remaining messages in the partition to one or more remaining consumers in the consumer group. After stopping message publishing at step 503 and removing the assignment at step 504, the remaining messages in the partition are consumed by the remaining consumers in the consumer group. In the example shown in FIG. 6, distributed streaming platform 600 adds a new assignment of partition 4 650 to consumer 2-C 675 in consumer group 2 670 and allows consumer 2-C 675 to consume the remaining messages in partition 4 650 (indicated by arrow 609).

At step 507, the distributed streaming platform allows one or more consumers in other consumer groups to continue consuming the remaining messages in the partition. The other consumer groups are groups in which no consumer is removed. In the example shown in FIG. 6, distributed streaming platform 600 keeps the assignment of partition 4 650 to consumer 1-B 663 in consumer group 1 660 and allows consumer 1-B 663 to continue consuming the remaining messages in partition 4 650 (indicated by arrow 607).

At step 508, the distributed streaming platform determines whether all the remaining messages are consumed. In response to determining that not all the remaining messages are consumed (NO branch of decision block 508), at step 509, the distributed streaming platform allows the one or more remaining consumers in the consumer group and the one or more consumers in the other consumer groups to continue consuming the remaining messages, until all the remaining messages are consumed.

In response to determining that all the remaining messages are consumed (YES branch of decision block 508), at step 510, the distributed streaming platform removes assignments of the partition to the one or more remaining consumers in the consumer group. In the example shown in FIG. 6, distributed streaming platform 600 removes the assignment of partition 4 650 to consumer 2-C 675 (the assignment is indicated by arrow 609). At step 511, the distributed streaming platform removes assignments of the partition to the one or more remaining consumers in the other consumer group. In the example shown in FIG. 6, distributed streaming platform 600 removes the assignment of partition 4 650 to consumer 1-B 663 (the assignment is indicated by arrow 607).

At step 612, the distributed streaming platform deletes the partition in the topic. Once the distributed streaming platform detects that no remaining messages exist in the partition, it will proceed to delete the partition from the topic. In the example shown in FIG. 6, partition 4 650 is deleted.

Figure 7:
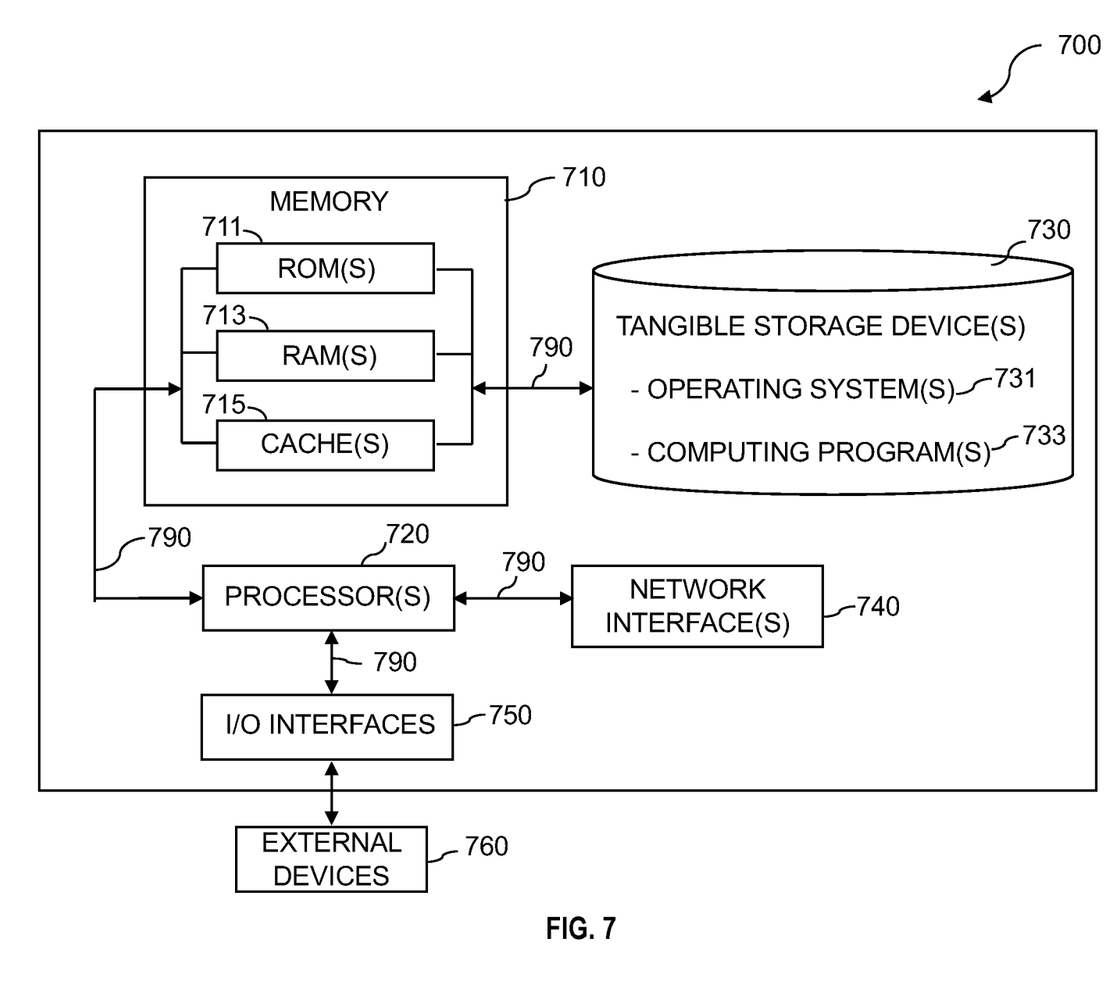
FIG. 7 is a diagram illustrating components of a computing device or a server, in accordance with one embodiment of the present invention.

FIG. 7 is a diagram illustrating components of computing device or server 700, in accordance with one embodiment of the present invention. It should be appreciated that FIG. 7 provides only an illustration of one implementation and does not imply any limitations with regard to an environment in which different embodiments may be implemented.

Referring to FIG. 7, computing device or server 700 includes processor(s) 720, memory 710, and tangible storage device(s) 730. In FIG. 7, communications among the above-mentioned components of computing device or server 700 are denoted by numeral 790. Memory 710 includes ROM(s) (Read Only Memory) 711, RAM(s) (Random Access Memory) 713, and cache(s) 715. One or more operating systems 731 and one or more computer programs 733 reside on one or more computer readable tangible storage device(s) 730.

Computing device or server 700 further includes I/O interface(s) 750. I/O interface(s) 750 allows for input and output of data with external device(s) 760 that may be connected to computing device or server 700. Computing device or server 700 further includes network interface(s) 740 for communications between computing device or server 700 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
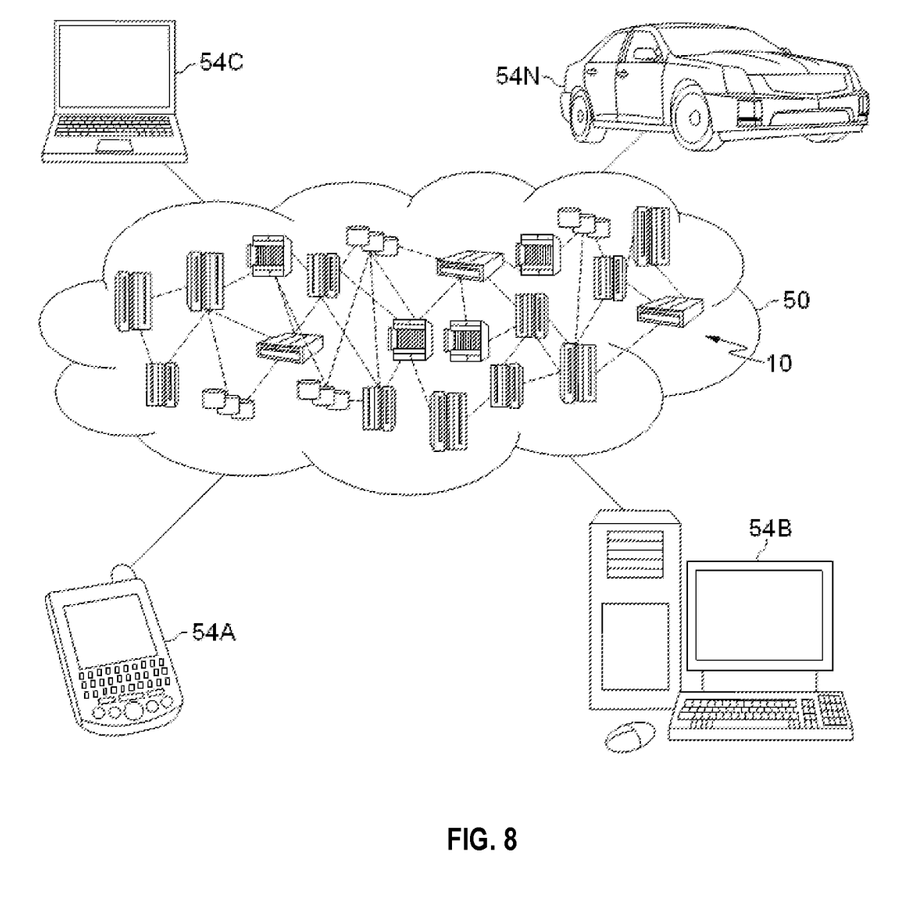
FIG. 8 depicts a cloud computing environment, in accordance with one embodiment of the present invention.

Referring now to FIG. 8, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 9:
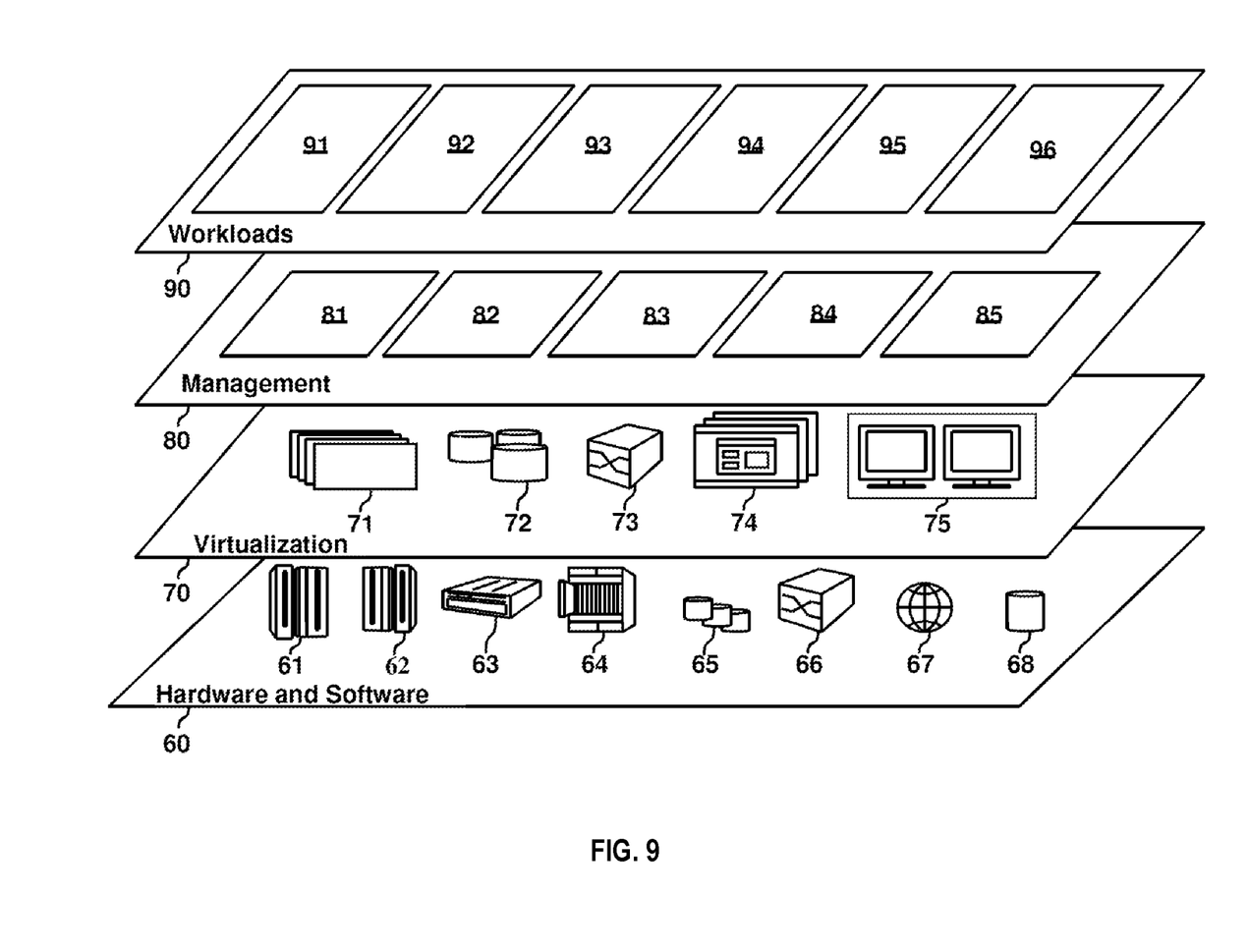
FIG. 9 depicts abstraction model layers in a cloud computing environment, in accordance with one embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of autoscaling a distributed streaming platform in an event-driven microservice architecture.

What is claimed is:

1. A computer-implemented method for downscaling a streaming platform in an event-driven microservice architecture, the method comprising:
   upon a consumer being removed from a consumer group that has a greatest number of consumers among consumer groups in a distributed streaming platform, determining whether a number of partitions in a topic in the distributed streaming platform is greater than a number of consumers in the consumer group;

in response to determining that the number of the partitions is greater than the number of consumers in the consumer group, downscaling the distributed streaming platform, wherein a partition consumed by the removed consumer is to be removed from the topic;

stopping message publishing to the to-be-removed partition;

removing an assignment of the to-be-removed partition to the removed consumer;

assigning remaining messages in the to-be-removed partition to one or more remaining consumers in the consumer group and to one or more consumers in consumer groups other than the consumer group;

determining whether all the remaining messages are consumed by the one or more remaining consumers in the consumer group and by the one or more consumers in the consumer groups other than the consumer group;

in response to determining that all the remaining messages are consumed, deleting the to-be-removed partition from the topic.

2. The computer-implemented method of claim 1, further comprising:
in response to determining that the number of partitions is greater than the number of consumers, performing no downscaling.

3. The computer-implemented method of claim 1, further comprising:
determining whether the consumer group has the greatest number of the consumers among the consumer groups.

4. The computer-implemented method of claim 1, further comprising:
in response to determining that not all the remaining messages are consumed, allowing the one or more remaining consumers in the consumer group and the one or more consumers in the consumer groups other than the consumer group to consume the remaining messages, until all the remaining messages are consumed.

5. The computer-implemented method of claim 1, further comprising:
in response to determining that all the remaining messages are consumed, removing assignments of the to-be-removed partition to the one or more remaining consumers in the consumer group; and
removing assignments of the to-be-removed partition to the one or more consumers in the consumer groups other than the consumer group.

6. A computer program product for downscaling a streaming platform in an event-driven microservice architecture, the computer program product comprising a computer readable storage medium having program instructions embodied therewith, the program instructions executable by one or more processors, the program instructions executable to:

upon a consumer being removed from a consumer group that has a greatest number of consumers among consumer groups in a distributed streaming platform, determine whether a number of partitions in a topic in the distributed streaming platform is greater than a number of consumers in the consumer group;

in response to determining that the number of the partitions is greater than the number of consumers in the consumer group, downscale the distributed streaming platform, wherein a partition consumed by the removed consumer is to be removed from the topic;

stop message publishing to the to-be-removed partition;

remove an assignment of the to-be-removed partition to the removed consumer;

assign remaining messages in the to-be-removed partition to one or more remaining consumers in the consumer group and to one or more consumers in consumer groups other than the consumer group;

determine whether all the remaining messages are consumed by the one or more remaining consumers in the consumer group and by the one or more consumers in the consumer groups other than the consumer group;

in response to determining that all the remaining messages are consumed, delete the to-be-removed partition from the topic.

7. The computer program product of claim 6, further comprising the program instructions executable to:
in response to determining that the number of partitions is greater than the number of consumers, perform no downscaling.

8. The computer program product of claim 6, further comprising the program instructions executable to:
determine whether the consumer group has the greatest number of the consumers among the consumer groups.

9. The computer program product of claim 8, further comprising program instructions executable to:
in response to determining that not all the remaining messages are consumed, allow the one or more remaining consumers in the consumer group and the one or more consumers in the consumer groups other than the consumer group to consume the remaining messages, until all the remaining messages are consumed.

10. The computer program product of claim 6, further comprising the program instructions executable to:
in response to determining that all the remaining messages are consumed, remove assignments of the to-be-removed partition to the one or more remaining consumers in the consumer group; and
remove assignments of the to-be-removed partition to the one or more remaining consumers in the consumer groups other than the consumer group.

* * * * *